Nov. 17, 1970 J. G. L. RHODES 3,541,527

DIGIT STORAGE AND TRANSMISSION MEANS

Filed Dec. 17, 1968 2 Sheets-Sheet 1

INVENTOR
J. G. L. Rhodes
BY
Watson, Cole, Grindle & Watson
ATTORNEYS

INVENTOR
J. G. L. Rhodes
BY
Watson, Cole, Grindle & Watson
ATTORNEYS

United States Patent Office 3,541,527
Patented Nov. 17, 1970

3,541,527

DIGIT STORAGE AND TRANSMISSION MEANS

John George Laycock Rhodes, Leatherhead, England, assignor to Telephone Manufacturing Company Limited Filed Dec. 17, 1968, Ser. No. 784,348
Claims priority, application Great Britain, Jan. 2, 1968, 282/68
Int. Cl. G11c *19/00;* G06f *3/00*
U.S. Cl. 340—172.5 11 Claims

ABSTRACT OF THE DISCLOSURE

The specification of this application discloses a data storage device having an entering and read-out system controlled by two processing shift registers and a telephone impulse sender unit incorporating such a storage device.

The present invention concerns data storage devices and in particular methods and means of controlling the entry of data into such devices and the read-out of data from such devices under circumstances where the rate of occurrence of data for entry is random and the rate of read-out is desirably standardised. Such circumstances arise for example in connection with telephone impulse senders where the user may select digits to be transmitted over the telephone line in a haphazard manner but it is desirable that the train of impulses actually transmitted should have a standard impulse frequency of 10 impulses per second with an interdigital pause between successive digits of a standard duration. The conventional rotary dial switch commonly used for impulse sending in telephone systems partially meets this problem by being so designed that the user is made to wait for the dial to restore to normal before a next digit can be selected. This however means that a standard interdigital pause cannot be ensured since different users will take different lengths of time to select and dial two successive digits.

The present invention provides a data storage device into which digits can be entered by the successive operation of push button switches at any speed convenient to the user and which will make available the digits stored in it at a rate compatible with their transmission to line in a standardised impulse train. The storage device of the invention can readily be realised in a compact form such that with its associated circuitry and the necessary push button switches it can form a unit to replace the conventional rotary dial switch by simple substitution of the one for the other in an otherwise conventional telephone instrument.

According to the invention there is provided an electronic data storage device comprising a data store, input means responsive to an input strobe pulse to enter a data item into said store, output means responsive to an output strobe pulse to read out a data item from said store, first and second recirculating signal delay devices each having a signal circulating therein with the two signals normally appearing at output ends of said first and second devices at the same instant in time, and each having a first circulation path connecting said output end of the device with the opposite, input, end, and a second circulation path connecting said input and output ends through a further one-step signal delay device, and gate means for selectively gating said circulating signal through said first and second circulation paths, means responsive to the presence of a data item to be entered into said store to apply the circulating signal of said first delay means as an input strobe pulse to said input means to effect entry of said data item into said store and also to momentarily reverse the state of the gate means of said first delay device to cause said circulating signal to precess by one step in relation to the signal circulating in said second delay means, and means responsive to non-coincidence between the respective circulating signals of said first and second delay devices at a predetermined point in the circulation paths thereof to apply the circulating signal of said second delay device as an output strobe pulse to said output means to effect read-out of a data item from said store and also to momentarily reverse the state of the gate means of said second delay device to cause the signal circulating therein to precess one step in relation to the signal circulating in said first delay device.

The various features and advantages of the invention will be apparent from the following description of an exemplary embodiment illustrated in the accompanying drawings which together constitute a logical circuit diagram of an impulse sender incorporating the invention and of which:

Figure 1:
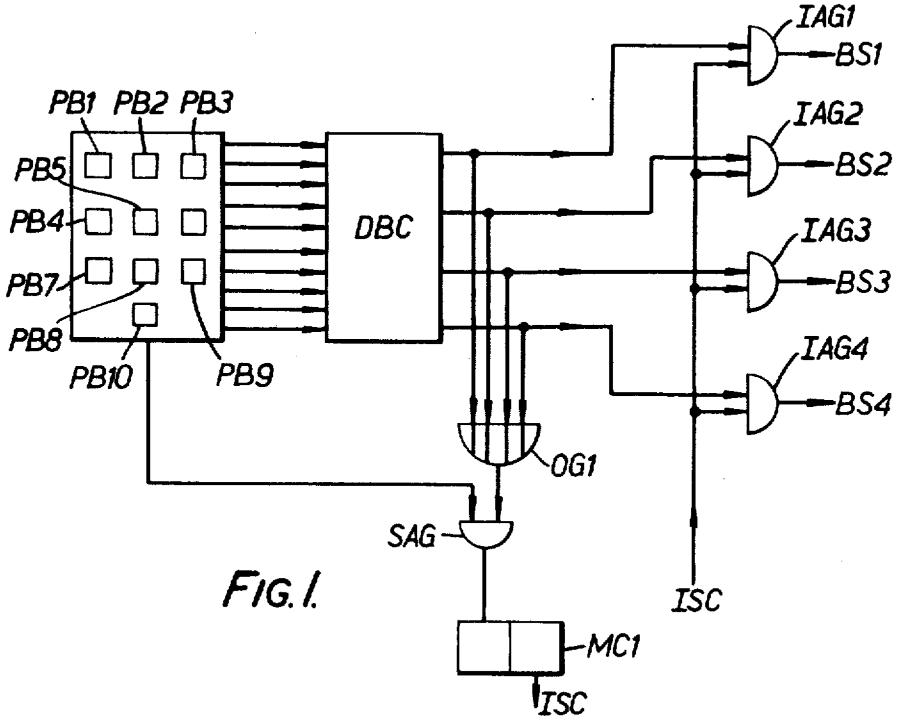
FIG. 1 is a schematic diagram of the push button digit entry of the sender.

Referring to the drawings the unit shown comprises ten push button switches PB1 to PB10 of the non-locking type, a decimal to binary converter DBC, four binary digit stores BS1 to BS4, a counter CTR, an input strobe generator ISG and an output strobe generator OSG, an interdigital pause generator IPG, a clock generator CG with derivation circuits for deriving pulses of different frequencies required in the operation of the unit, an impulsing relay IR and an off-normal relay OR. The purpose of the unit is to simulate the functions of off-normal indication and impulse generation normally provided by the operation of a conventional rotary dial switch, in response to successive actuation of various ones of the push buttons PB1 to PB10 and to this end the various devices referred to above are interconnected and controlled in operation by AND and OR gates, inverters and bistable elements as will later be described.

The decimal to binary converter DBC may be of any well known conventional form its precise make-up not forming part of the present invention. It may for example be a simple diode matrix arranged to give either a 0 or a 1 condition on each of four outputs in response to the energisation of any one of ten inputs having different decimal significance, the four outputs having the binary 1, 2, 4, 8 significance equivalent to the decimal significance of the energised input.

The four binary digit stores BDS1 to BDS4 and the strobe generators ISG and OSG are each constituted by shift registers of any well known conventional form, the precise circuit configuration of these registers again not forming part of the invention. Equally the clock generator CG and its associated derivation circuits may be of any conventional form.

To achieve the economy in overall size which is necessary to make the whole unit of a size comparable to that of a conventional rotary dial switch, integrated circuit chips are used to realise the various register circuits, counters, gates, etc., constituting the unit, the active elements being transistors, preferably field effect transistors (FET's).

The various circuits are arranged to function in the following manner. It is arranged that upon removing the handset of the telephone instrument with which the unit is associated, a reset circuit RS is energised through a 100 ms. resistance-capacity delay circuit DC and applies a reset impulse to all the registers and counters of the unit to ensure that all these devices are in normal state at the commencement of operations. To transmit a telephone number the user depresses in turn those of the push buttons PB1 to PB10 which correspond to the individual decimal digits making up such telephone number and the unit responds to each push button depressed to first store the corresponding decimal digit in binary form and then transmit impulses corresponding to the decimal digits stored in an even succession at a constant rate of ten impulses per second with a 0.8 second interdigital pause between each two successive digits under the control of the clock generator CG. Thus a standardised transmission of impulses is achieved regardless of the speed at which successive push buttons are depressed provided that such speed is not less than is required to maintain the standardised transmission. The operation of the circuits is the same, apart from numerical significance for each digit and it will therefore suffice to describe such operation in relation to one such digit.

Figure 2:
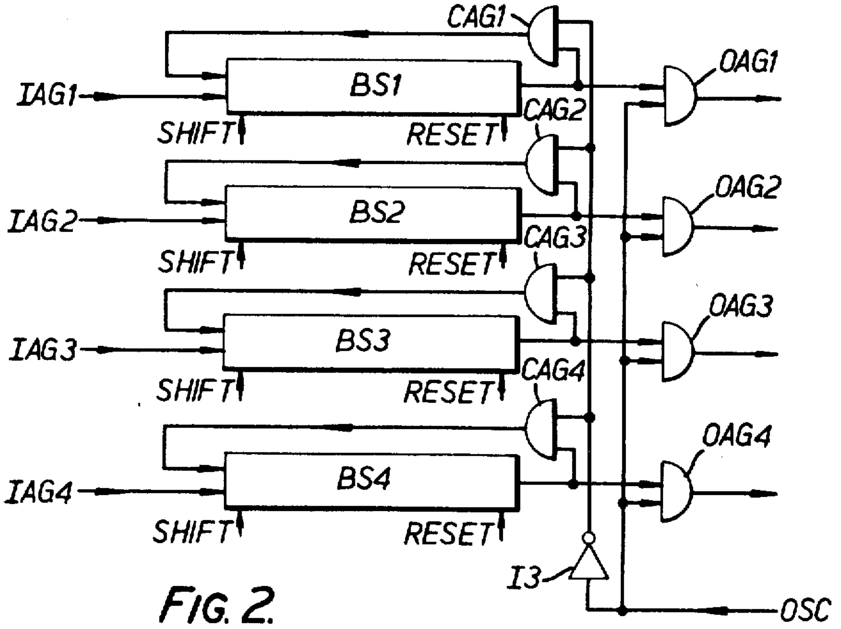
FIG. 2 is a schematic diagram of the storage device of the sender.
Figure 3:
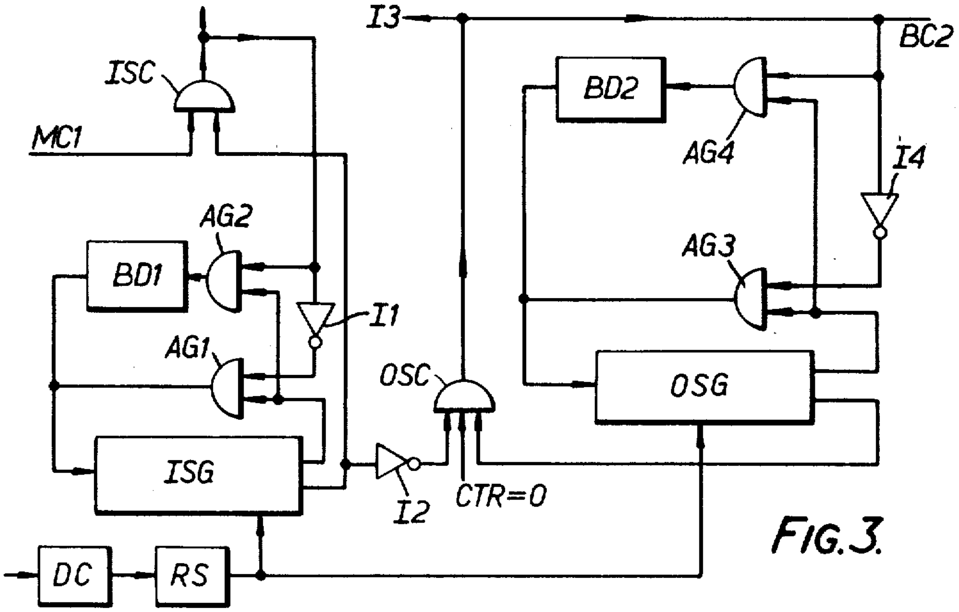
FIG. 3 is a schematic diagram of the entry and read out control arrangements of the storage device of FIG. 2

When any one of the push button switches PB1 to PB10 is depressed, a pulse is applied to a start AND gate SAG and one of the ten inputs to the converter DBC is energised and a pattern of binary 0 and 1 states appropriate to the decimal value of such push button appears on the four outputs of the converter and thus on the four inputs of an OR gate OG1 and upon one input AND gates IAG1 to IAG4 of four binary stores BS1 to BS4 (FIG. 2). Gate OG1, in response to such input, applies an output to gate SAG which corresponds to its two inputs to operate a monostable anti-contact bounce circuit MC1, which remains operated despite any fluctuations in output of the converter due to contact bounce in the contacts of the push button switch until such switch is released. The switching of circuit MC1 to operated condition generates a pulse which primes an input strobe control circuit ISC (FIG. 2) to respond to a signal from an input strobe generator ISG.

This generator ISG is a constantly driven shift register having sixteen stages with the output stage connected to the input stage through alternative circulation paths, respectively controlled by AND gates AG1 and AG2, the path controlled by gate AG2 having a one bit delay circuit BD1 included in it and the other path including no delay. The output of control circuit ISC is connected to gate AG2 and through an inverter I1 to the gate AG1 so that in the absence of an output from the circuit ISC gate AG2 is inhibited and gate AG1 is primed with the result that the contents of the shift register ISG are constantly recirculating through gate AG1. It is arranged that a single binary 1 is present in the first stage of register ISG upon reset and all the other stages are set to binary 0 condition so that each sixteen shift intervals after reset a binary 1 appears at the output of register ISG during quiescent conditions, i.e., when there is no output from the converter DBC.

When, however, circuit ISC is primed by circuit MC1 the next binary 1 at the output of register ISG causes circuit ISC to emit an output pulse which reverses the respective states of gates AG1 and AG2 and primes input gates IAG1 to IAG4.

This reversal of gates AG1 and AG2 causes the binary 1 at the output of register ISG to be subjected to a one bit delay before it is entered into the input stage of the register ISG so that it is now seventeen shift periods before the binary 1 again appears at the output of the register.

The priming of gates IAG1 to IAG4 causes the binary number on the output leads from the converter DBC to be entered into the input stages of the four binary stores BS1 to BS4 which are also continuously driven recirculating shift registers of sixteen bit capacity and shift in synchronism with the generator ISG. These stores are normally empty (all stages registering binary 0) upon reset.

Thus in response to the presence of an output from the converter DBC such output is stored in the stores BS1 to BS4 and the circulating binary 1 in the register ISG is processed by one bit time.

Figure 4:
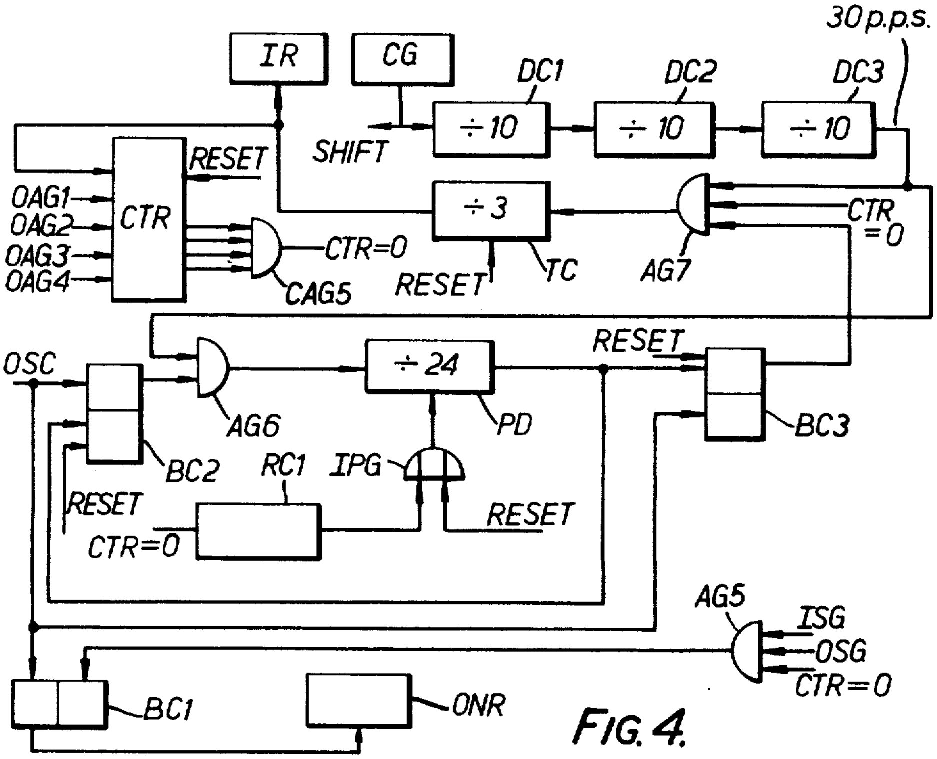
FIG. 4 is a schematic diagram of the impulse generating and timing control arrangements of the sender.

The output of the register ISG is also applied through an inverter I2 to one input of a three-input strobe control AND gate OSC which is arranged to yield an output strobe pulse when all three of its inputs are in appropriate stage. A second input to the gate OSC is provided by an AND gate CAG5 (FIG. 4) which responds to all the stages of an impulse counter CTR being at zero, and the third input to gate OSC is from the output stage of an output strobe generator OSG which is a continuously driven recirculating shift register of sixteen bit capacity operating in synchronism with the input strobe generator ISG and also having its input stage set to binary 1 condition and all other stages to binary 0 condition upon reset.

The arrangement is such that with the impulse counter CTR at zero count, which is its normal condition upon reset, the simultaneous appearance on two of the inputs to gate OSC of an inverted binary 0 from register ISG and a binary 1 from register OSG causes gate OSC to emit an output strobe pulse. The inversion of the signal from register ISG ensures that gate OSC cannot be activated at a time when a binary 1 is at the output of register ISG. The output strobe pulse from gate OSC is applied to four output AND gates OAG1 to OAG4 respectively connected between the output stages of the stores BS1 to BS4 and four inputs to the impulse counter CTR. This counter comprises four bistable counting stages respectively settable by the four inputs controlled by the gates OAG1 to OAG4 so that upon the appearance of an output strobe pulse the number stored at that time on the output stages of stores BS1 to BS4 is transferred to the impulse counter CTR.

The output strobe pulse is also applied through an inverter I3 to four AND gates CAG1 to CAG4 in the circulation paths between the output and input stages of the stores BS1 to BS4 to inhibit these gates and thus render destructive the read-out of the binary number from the output stages of these stores, and once a number has been transferred to counter CTR by such readout, gate CAG5 is inhibited and one input to gate OSC thus removed so that no further output strobe pulse can be emitted until the counter CTR is restored to zero count.

The output strobe pulse from gate OSC is also applied directly to an AND gate AG4 and through an inverter I4 to an AND gate AG3, which gates function in the same manner as gates AG1 and AG2 of the input strobe generator ISG to cause the binary 1 at the output of the output strobe generator OSG to be precessed by one bit time due to the inclusion of a one bit delay circuit BD2 in the effective circulation path between the output and input stages of register OSG. Thus, provided no other digits have been entered into the converter DBC in the meantime, the two binary 1 digits now circulate in the respective registers ISG and OSG with the same degree of precession and gate OSC cannot again be activated until the binary 1 from register ISG has again been delayed with respect to that from register OSG.

The output strobe pulse is further applied to a bistable circuit BC1 (FIG. 4) which controls the simulation of the off-normal function of a rotary dial switch by any convenient means ONR external to the unit which may, for example, be an electromagnetic relay preferably a reed relay having contacts arranged to indicate the off-normal condition. Circuit BC1 is arranged to be restored to normal by an AND gate AG5 responsive to a binary 1 from both registers ISG and OSG and zero count in counter CTR, a condition which only exists when all digits applied by the push button switches have been transmitted as will be apparent from the description which follows relating to the generation of output impulses.

The output strobe pulse is also applied to two further bistable circuits BC2 and BC3 of the interdigital pause generator IPG. This latter in addition to the two bistable circuits BC2 and BC3 comprises an AND gate AG6 and a counter PD arranged to divide, by a scale of twenty-four, input pulses applied to it through gate AG6 and to apply an output signal to reset bistable circuits BC2 and BC3. Circuit BC2 in its normal state inhibits gate AG6 but, when switched by an output strobe pulse, it primes gate AG6 to the other input of which pulses at a frequency of 30 per second derived from the clock generator CG are continuously applied. Thus after a delay of approximately 0.8 second after an output strobe pulse is applied to bistable circuit BC2, counter PD applies a resetting pulse to bistable BC3 to switch it back to normal condition.

Bistable circuit BC3 is arranged to inhibit an AND gate AG7 for the 0.8 second delay period that the circuit is switched from its normal state and gate AG7 is arranged to control the application of driving impulses to an impulsing relay IR external to the unit. These driving impulses are derived from the clock generator output by a series of counters arranged as frequency dividers. The clock generator CG emits pulses at a frequency of 30 kHz. which are applied to three scale-of-ten counters DC1, DC2 and DC3 arranged in series so that counter DC3 yields an output of pulses at 30 per second. This output is applied to the gate AG7 of the pause generator IPG and also to the gate AG7. The output from gate AG7 is applied to a scale-of-three counter TC which yields output pulses at the rate of 10 per second with each pulse lasting one thirtieth of a second and being separated from the next by a pause of one fifteenth of a second. Gate AG7 is also arranged to receive the output of gate CAG5 of counter CTR in such manner that gate AG7 is inhibited when the count registered in counter CTR is zero.

The 10 pulse per second output of counter TC is applied not only to drive the impulsing relay IR as previously stated, but also to drive the counter CTR from the count registered in it down to zero count. Thus upon a number of pulses from counter TC equal to the number stored in counter CTR being applied both to that counter CTR and to the impulsing relay IR, the gate CAG5 responds to the zero count condition of counter CTR and inhibits gate AG7 thereby cutting off the supply of 30 pulse per second pulses to counter TC. At this time the gate CAG5 also applies a signal through a differentiating circuit RC1 to a reset OR gate OG2 which in turn applies a reset signal to counter PD to set it to zero count. The OR gate OG2 also admits reset signals from the reset circuit RS to the counter PD for the same purpose.

In the foregoing description the operation of the unit in respect of a single input digit only has been described. In normal use several digits will have been keyed into the unit by successive operation of the different push button switches PB1 to PB10 before the impulses corresponding to the first digit have been transmitted to line by the impulsing relay IR. It will be appreciated that in this respect the stores BS1 to BS4 act as a buffer store of sixteen digits capacity to allow at least another fifteen digits to be entered while the first one is being impulsed to line. The maximum speed of entry of digits into this buffer store is determined by the circulation period of the input strobe register ISG as a separate strobe pulse is required for each digit entered and the register ISG can only yield one output pulse per cycle of circulation. Since, however, the register ISG is shifted under the control of 30 kHz. clock pulses from the clock pulse generator this maximum speed is far in excess of that required to accept successive digits from successive push button operations.

The effect of entering digits by means of the push button switches at a faster rate than they are impulsed to line by the impulsing relay is simply that the binary 1 in register ISG is precessed by one bit time more frequently than that in register OSG during the entry period. Since however the registers of the input and output strobe generators have the same capacity as the stores BS1 to BS4 the maximum permissible differential precession of fifteen matches the additional digit storage capacity of the stores and there is no risk of the various circuits being forced out of synchronism. After such a rapid entry period the input strobe generator has no further duty to perform except to act as an indicator of the position of its binary 1 relative to that in the output strobe generator until the latter binary 1 is precessed, by reason of the stored digits being impulsed to line, to the same position whereupon gate OSC is inhibited and no further output strobe pulses are applied to the gates OAG1 to OAG4 and the bistable circuits BC2 and BC3, and the whole unit is in quiescent state.

When the handset is replaced, the reset circuit RS responds to apply a reset signal to all the registers and counters.

The power for the transistors in the circuits described above can be provided from any convenient source local to the telephone instrument but is preferably supplied by a rechargeable storage cell located in the instrument casing and connected to be recharged during each conversation period following the transmission of impulses, from the exchange battery of the telephone system to which the instrument is connected.

I claim:

1. An electronic data storage device comprising a data store, input means responsive to an input strobe pulse to enter a data item into said store, output means responsive to an output strobe pulse to read out a data item from said store, first and second recirculating signal delay devices each having a signal circulating therein with the two signals normally appearing at output ends of said first and second devices at the same instant in time, and each having a first circulation path connecting said output end of the device with the opposite, input, end, and a second circulation path connecting said input and output ends through a further one-step signal delay device, and gate means for selectively gating said circulating signal through said first and second circulation paths, means responsive to the presence of a data item to be entered into said store to apply the circulating signal of said first delay means as an input strobe pulse to said input means to effect entry of said data item into said store and also to momentarily reverse the state of the gate means of said first delay device to cause said circulating signal to precess by one step in relation to the signal circulating in said second delay means, and means responsive to non-coincidence between the respective circulating signals of said first and second delay devices at a predetermined point in the circulation paths thereof to apply the circulating signal of said second delay device as an output strobe pulse to said output means to effect read-out of a data item from said store and also to momentarily reverse the state of the gate means of said second delay device to cause the signal circulating therein to precess one step in relation to the signal circulating in said first delay device.

2. A data storage device as claimed in claim 1 wherein said first and second delay devices are each constituted by a multistage shift register and each said one-step delay device has a delay period equal to the shift period between successive stages of said registers.

3. A device as claimed in claim 2 wherein said data store is constituted by at least one multistage recirculating shift register having the same number of stages as the registers of said first and second delay devices and all the shift registers are driven from a common shift pulse source.

4. A device as claimed in claim 3 wherein said store is constituted by four said registers each having one said input means and one said output means the respective means of said input registers being connected to four binary outputs of a decimal to binary converter having ten individual input means each having a different decimal significance, the converter operating to yield a binary equivalent output in response to a signal from any one of said individual input means.

5. A device as claimed in claim 4 wherein the respective output means of said registers are connected to individual stages of a four stage binary counter and arranged when actuated by a strobe pulse applied thereto to set the stages of said counter in accordance with the binary significance of the data items currently appearing at the output stages of said registers.

6. A device as claimed in claim 5 wherein said counter is connected to be driven from a source of fixed frequency pulses to count down to zero from the setting applied thereto by said output means at a rate determined by the frequency of said pulses and has connected thereto gating means responsive to the zero count condition of said counter to inhibit the output of pulses from said source.

7. A device as claimed in claim 6 wherein said pulse source is also connected to an impulsing relay which responds to each pulse applied thereto from said source to deliver an output impulse.

8. A device as claimed in claim 6 wherein said pulse source is arranged to be inhibited by gating means controlled by the output of a delay means to the input of which said output strobe pulse is applied, whereby said delay means serves to impose a predetermined inter-digital pause between the emission of two successive trains of pulses by said pulse source.

9. A device as claimed in claim 8 wherein said pulse source is constituted by a clock pulse generator and a plurality of counters connected in series and arranged to divide the frequency of the output of said clock source by successive factors to arrive at the fixed frequency of the pulses applied to said four stage binary counter.

10. A device as claimed in claim 9 wherein one of said frequency dividing counters other than the one supplying said fixed frequency pulses to said binary counter is connected to supply pulses to a further counter serving as the delay element of said delay means under the control of gate means itself controlled by said output strobe pulse.

11. A device as claimed in claim 10 wherein said delay means further comprises a bistable device arranged to be set in one of its stable states by said output strobe pulse and to control the gating means of said pulse source to inhibit the emission of pulses by said source, and to be returned to its other stable state in response to an output pulse from said further counter to remove the inhibition of said pulse source.

References Cited

UNITED STATES PATENTS

| | | |
|---|---|---|
| 3,225,333 | 12/1965 | Vinal. |
| 3,341,819 | 9/1967 | Emerson. |
| 3,350,509 | 10/1967 | Lee et al. |
| 3,456,085 | 7/1969 | Huizinga et al. |

GARETH D. SHAW, Primary Examiner

U.S. Cl. X.R.

179—16